US 10,144,600 B2

(12) United States Patent
Hanamoto

(10) Patent No.: US 10,144,600 B2
(45) Date of Patent: Dec. 4, 2018

(54) SHEET FEEDER, READING APPARATUS AND IMAGE FORMING APPARATUS THAT REDUCE VIBRATION SOUND IN ASSOCIATION WITH IDLING OF SUPPLY ROLLER

(71) Applicant: Kyocera Document Solutions Inc., Osaka (JP)

(72) Inventor: Katsuhiko Hanamoto, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/820,542

(22) Filed: Nov. 22, 2017

(65) Prior Publication Data

US 2018/0141766 A1 May 24, 2018

(30) Foreign Application Priority Data

Nov. 22, 2016 (JP) .................................. 2016-226791

(51) Int. Cl.
*B65H 3/06* (2006.01)
*B41J 13/03* (2006.01)
(Continued)

(52) U.S. Cl.
CPC ............ *B65H 3/0676* (2013.01); *B41J 13/03* (2013.01); *B65H 1/04* (2013.01); *B65H 3/0669* (2013.01);
(Continued)

(58) Field of Classification Search
CPC .......... B65H 2403/72; B65H 2403/721; B65H 2403/722; B65H 3/0669; B65H 3/0684;
(Continued)

(56) References Cited

U.S. PATENT DOCUMENTS 6,446,954 B1 * 9/2002 Lim ........................ B65H 3/06
271/10.04
7,296,790 B2 * 11/2007 Kim ..................... B65H 3/0684
271/114
(Continued)

FOREIGN PATENT DOCUMENTS

JP 2002-265081 A 9/2002
JP 2005067830 A * 3/2005
JP 2009-203071 A 9/2009
JP 2010255706 A * 11/2010

*Primary Examiner* — Luis A Gonzalez
(74) *Attorney, Agent, or Firm* — HEA Law PLLC

(57) ABSTRACT

A sheet feeder includes a delivery roller, a supply roller, a separating member, a driving source, a first drive transmission mechanism, a second drive transmission mechanism, and a controller. The first drive transmission mechanism transmits the rotary drive power in the first direction to the delivery roller in a first drive transmission time from the start of driving of the driving source. The second drive transmission mechanism transmits the rotary drive power in the first direction to the supply roller in a second drive transmission time from the start of driving of the driving source. The second drive transmission period of the second drive transmission mechanism is longer than the first drive transmission period of the first drive transmission mechanism. When the control starts driving the driving source, the supply roller starts to rotate in the first direction after the delivery roller starts to rotate in the first direction.

5 Claims, 12 Drawing Sheets

(51) Int. Cl.
    *B65H 1/04*             (2006.01)
    *B65H 5/06*             (2006.01)
    *G03G 15/00*           (2006.01)
    *H04N 1/00*            (2006.01)
    *B41J 2/01*             (2006.01)

(52) U.S. Cl.
    CPC ............ *B65H 3/0684* (2013.01); *B65H 5/06* (2013.01); *G03G 15/6502* (2013.01); *G03G 15/6511* (2013.01); *H04N 1/00602* (2013.01); *H04N 1/00795* (2013.01); *B41J 2/01* (2013.01); *B65H 2403/72* (2013.01); *B65H 2403/721* (2013.01); *B65H 2513/50* (2013.01); *B65H 2513/53* (2013.01); *B65H 2801/03* (2013.01)

(58) Field of Classification Search
    CPC ............ B65H 2513/50; B65H 2513/51; B65H 2513/514; B65H 2513/53; B65H 2513/54
    See application file for complete search history.

(56) References Cited

U.S. PATENT DOCUMENTS

| | | | |
|---|---|---|---|
| 2010/0013145 A1* | 1/2010 | Spall | B65H 3/62 271/126 |
| 2012/0043716 A1* | 2/2012 | Morikawa | B65H 3/0669 271/264 |
| 2016/0244283 A1* | 8/2016 | Esaka | B65H 3/0669 |

* cited by examiner

SHEET FEEDER, READING APPARATUS AND IMAGE FORMING APPARATUS THAT REDUCE VIBRATION SOUND IN ASSOCIATION WITH IDLING OF SUPPLY ROLLER

INCORPORATION BY REFERENCE

This application is based upon, and claims the benefit of priority from, corresponding Japanese Patent Application No. 2016-226791 filed in the Japan Patent Office on Nov. 22, 2016, the entire contents of which are incorporated herein by reference.

BACKGROUND

Unless otherwise indicated herein, the description in this section is not prior art to the claims in this application and is not admitted to be prior art by inclusion in this section.

For example, there is known a typical image forming apparatus that forms an image on a sheet that is sent out to a conveying path from a sheet feeder and is further conveyed along the conveying path. The sheet feeder includes a bottom plate, a pickup roller, a friction pad, and a feed roller. Then, the sheet feeder sends out a sheet arranged in an overlapped state on the bottom plate on the friction pad by the pickup roller rotating around a shaft, and supplies the sheet to the conveying path by rotating the feed roller around a shaft while sandwiching the sheet on the friction pad by the feed roller and the friction pad.

SUMMARY

A sheet feeder according to one aspect of the disclosure includes a delivery roller, a supply roller, a separating member, a driving source, a first drive transmission mechanism, a second drive transmission mechanism, and a controller. The delivery roller sends out a sheet to a conveying path by rotating in a first direction around a first shaft while contacting the sheet. The supply roller rotates in the first direction around a second shaft to supply the sheet to a downstream side of the conveying path. The separating member is arranged on an opposite side of the supply roller across the conveying path. The separating member forms a nip with the supply roller to separate a plurality of sheets. The driving source generates a rotary drive power to rotate the delivery roller and the supply roller in the first direction. The first drive transmission mechanism transmits the rotary drive power in the first direction to the delivery roller in a first drive transmission time from the start of driving of the driving source. The second drive transmission mechanism transmits the rotary drive power in the first direction to the supply roller in a second drive transmission time from the start of driving of the driving source. The controller controls the driving source. The second drive transmission period of the second drive transmission mechanism is longer than the first drive transmission period of the first drive transmission mechanism. When the control starts driving the driving source, the supply roller starts to rotate in the first direction after the delivery roller starts to rotate in the first direction.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
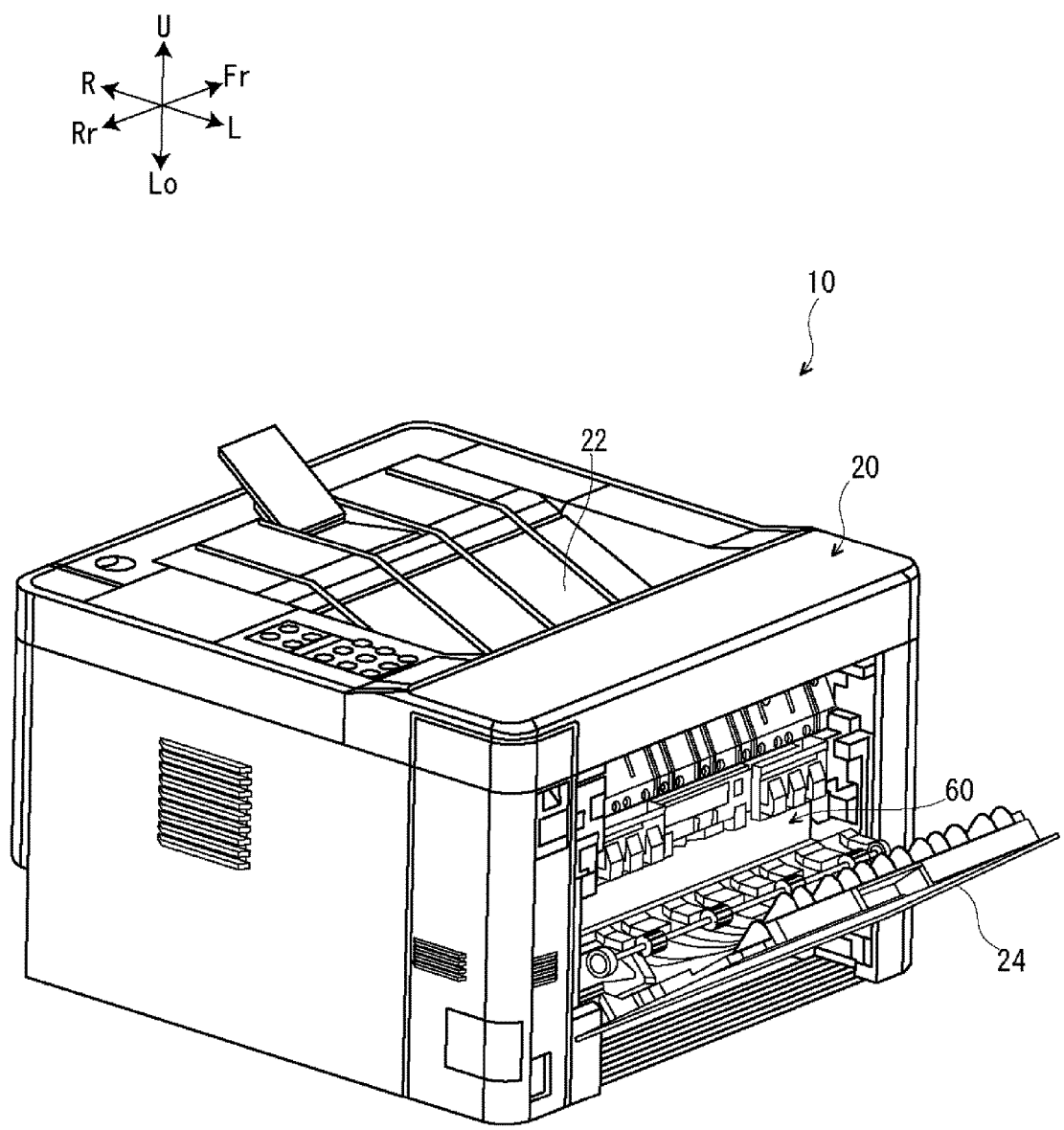
FIG. 1 obliquely illustrates an image forming apparatus of a configuration for implementing the disclosure (hereinafter referred to as embodiment).

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Overview

The following describes an overall configuration of an image forming apparatus 10 (see FIGS. 1 and 2) according to embodiments, an image forming operation by the image forming apparatus 10, a configuration of a sheet feeder 60

(see FIGS. 3 to 8) as a main part of the embodiments, a supplying operation by the sheet feeder 60 according to the embodiments, and an effect of the embodiments in order of these descriptions by referring to the drawings.

In the following description, in the drawings, directions indicated by an arrow Fr and an arrow Rr are respectively defined as an apparatus-depth-direction front side and an apparatus-depth-direction far-side, the directions indicated by an arrow R and an arrow L are respectively defined as an apparatus-width-direction right side and an apparatus-width-direction left side, and the directions indicated by an arrow U and an arrow Lo are respectively defined as an apparatus-height-direction upper side and an apparatus-height-direction lower side. The description describes a state viewing the image forming apparatus 10 from the apparatus-depth-direction front side as a front surface of the image forming apparatus 10.

Overall Configuration of Image Forming Apparatus

A description will be given of the overall configuration of the image forming apparatus 10 by referring to FIGS. 1 and 2. The image forming apparatus 10 is an apparatus using an electrophotographic method configured including a main body 20, a sheet feed cassette 30, a conveyance apparatus 40, an image forming unit 50, the sheet feeder 60, and a control unit CU.

The main body 20 has a function to house the sheet feed cassette 30, the conveyance apparatus 40, the image forming unit 50, the sheet feeder 60, and the control unit CU in its inside. The main body 20 is a box-shaped external package. A top surface of the main body 20 includes a discharge tray 22 where a sheet S with a toner image fixed (an image formed) is discharged. A lid 24 is located in a left end surface of the main body 20 viewed from the front side, and a fixing unit 56, which will be described later, is removably attachable to the main body 20 in a state where the lid 24 is tilted (see FIG. 1).

The sheet feed cassette 30 has a function to house the sheet S to which an image is to be formed (at later processes) in an overlapped state. The sheet feed cassette 30 is arranged in a lower side of the main body 20.

The conveyance apparatus 40 has a function to convey the sheet S, which is housed in the sheet feed cassette 30 and is supplied from the sheet feeder 60 described later, up to the discharge tray 22 along a conveying path P. The conveyance apparatus 40 includes a plurality of rollers (driven rollers and drive rollers) and a driving source (not illustrated) that drives the drive rollers. Here, the direction that an arrow Y indicates in FIG. 2 is a conveyance direction of the sheet S.

The image forming unit 50 has a function to form an image on the sheet S conveyed by the conveyance apparatus 40. The image forming unit 50 is arranged in a center inside the main body 20 viewed from the front side. The image forming unit 50 is configured including a photoreceptor 51, a charging apparatus 52, an exposure apparatus 53, a developing device 54, a transfer roller 55, and the fixing unit 56. The image forming unit 50 according to the embodiment charges the photoreceptor 51 that rotates around a shaft by the charging apparatus 52, exposes the photoreceptor 51 by the exposure apparatus 53 to form a latent image, develops the latent image as a toner image by the developing device 54, transfers the toner image on the sheet S by the transfer roller 55, and fixes the toner image on the sheet S, where the toner image has been transferred, by the fixing unit 56. As described above, the image forming unit 50 forms an image on the sheet S. The image forming unit 50 is arranged on a downstream side of the conveying path P with respect to the sheet feeder 60, which will be described later.

The sheet feeder 60 has a function to supply the sheet S housed in the sheet feed cassette 30 one by one to the conveyance apparatus 40. The specific configuration of the sheet feeder 60 will be described later.

The control unit CU has a function to receive image data from an external device (not illustrated) to control respective components that configure the image forming apparatus 10 based on the image data. A specific function of the control unit CU will be described in the description of the image forming operation and the supplying operation, which will be described later.

Image Forming Operation

Next, a description will be given of the image forming operation that uses the image forming apparatus 10 according to the embodiment by referring to FIG. 2.

First, the control unit CU that has received image data from the external device (not illustrated) operates the image forming unit 50. Then, the charging apparatus 52 charges the photoreceptor 51, the exposure apparatus 53 exposes the photoreceptor 51 to form a latent image, the developing device 54 develops the latent image as a toner image, and thus the toner image is formed on the photoreceptor 51.

The control unit CU operates the sheet feeder 60 and the conveyance apparatus 40 to send the sheet S into a transfer position by adjusting a timing when the toner image formed on the photoreceptor 51 reaches the transfer position (the portion where the photoreceptor 51 and the transfer roller 55 are in contact) by rotation of the photoreceptor 51 around the shaft. Then, the transfer roller 55 causes the toner image formed on the photoreceptor 51 to be transferred on the sheet S, and the toner image is formed on the sheet S.

Next, the fixing unit 56 fixes the toner image, which has been transferred on the sheet S by the transfer roller 55, on the sheet S. Then, the sheet S with the toner image fixed, namely, the sheet S with the image formed is further conveyed to a conveyance-direction downstream side by the conveyance apparatus 40 and is discharged to the discharge tray 22 of the main body 20, and thus the image forming operation is terminated.

Configuration of Main Part (Sheet Feeder)

Next, a description will be given of the configuration of the sheet feeder 60, which is a main part of the embodiment, in detail by referring to FIGS. 3 to 8.

The sheet feeder 60, as illustrated in FIGS. 3, 4, 5 and 6, is configured including a housing 61, a pickup roller 62 (an exemplary delivery roller), a separation pad 63 (an exemplary separating member), a supply roller 64 (an exemplary feed roller), and a rotating unit 65. In the following, the pickup roller is denoted as PR, and the supply roller is denoted as SR. That is, the pickup roller 62 is denoted as the PR 62, and the supply roller 64 is denoted as the SR 64.

Housing

The housing 61 has a function to support the PR 62, the SR 64, and a part of the rotating unit 65 (a first one-way clutch 70, a second one-way clutch 80, and a transmission gear 90, which will be described later) at a predetermined positional relationship (see FIGS. 2, 3, and 4). The housing 61 is opened in the lower side. Here, the predetermined positional relationship means a positional relationship where the PR 62, the SR 64, and the rotating unit 65 are aligned in this order from the apparatus-depth-direction front side to the apparatus-depth-direction far-side while the PR 62, the transmission gear 90, and SR 64 are aligned in this order from a left side to a right side viewing the image forming apparatus 10 from the front side (see FIGS. 2 to 4). The housing 61 swings around a shaft of the SR 64, which will be described later. Here, FIG. 3 illustrates when the sheet feeder 60 is in a state before the supplying operation (during standby), namely, in a state where the PR 62 is separated from the sheet S, and FIG. 4 illustrates when the sheet feeder 60 is in a state during the supplying operation, namely, in a state where the PR 62 is in contact with the sheet S.

PR

The PR 62 has a function to send out the sheet S housed in the sheet feed cassette 30 to the conveying path P. As illustrated in FIGS. 2 to 4, the PR 62 is arranged above the sheet feed cassette 30 and in the right-side portion viewing the image forming apparatus 10 from the front side. As illustrated in FIGS. 3 to 6, the PR 62 includes a rubber-made pipe 62A and a shaft 62B. The shaft 62B, onto the outer periphery of which the pipe 62A is fitted and secured, protrudes from both ends of the pipe 62A, and is rotatably supported by the housing 61 in a state where its axial direction is aligned with the apparatus depth direction.

Then, the PR 62 rotates in a predetermined direction (an arrow direction attached to the PR 62 in FIG. 6) around the shaft while contacting with an uppermost sheet S among the sheets S housed in the overlapped state in the sheet feed cassette 30 to send out the uppermost sheet S to the conveying path P (that is on the right side viewing the image forming apparatus 10 from the front side). The description defines a rotation in the predetermined direction as a normal rotation (a first direction), and a rotation in a reverse direction as a reverse rotation.

Separation Pad

Figure 2:
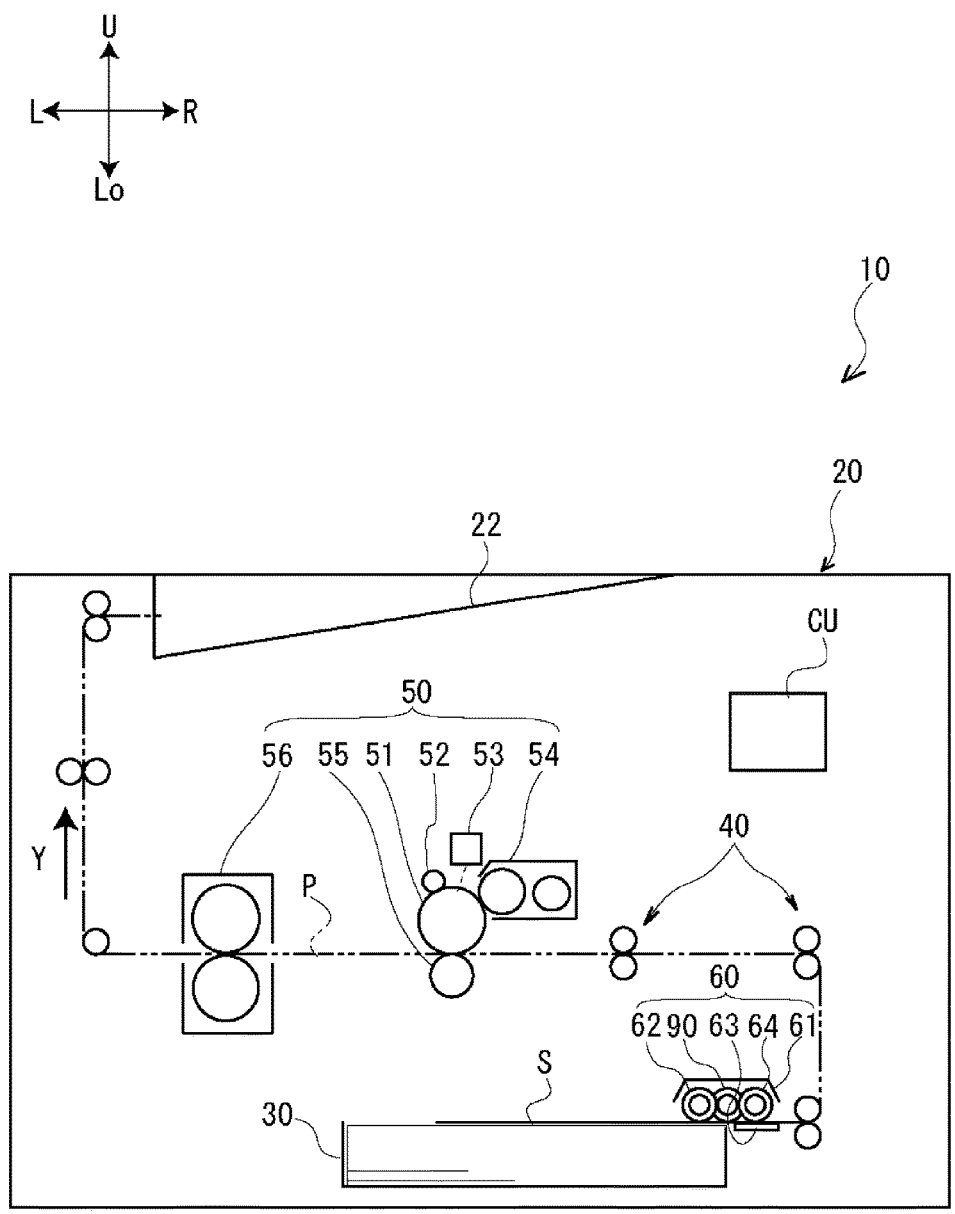
FIG. 2 illustrates a schematic diagram viewing the image forming apparatus according to the embodiment from a front side.
Figure 3:
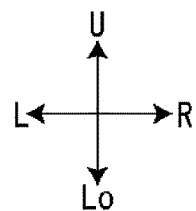
FIG. 3 is a diagram viewing a sheet feeder configuring the image forming apparatus according to the embodiment from the front side, and illustrates a schematic diagram illustrating a state (a standby state) before a supplying operation of the sheet feeder.
Figure 3:
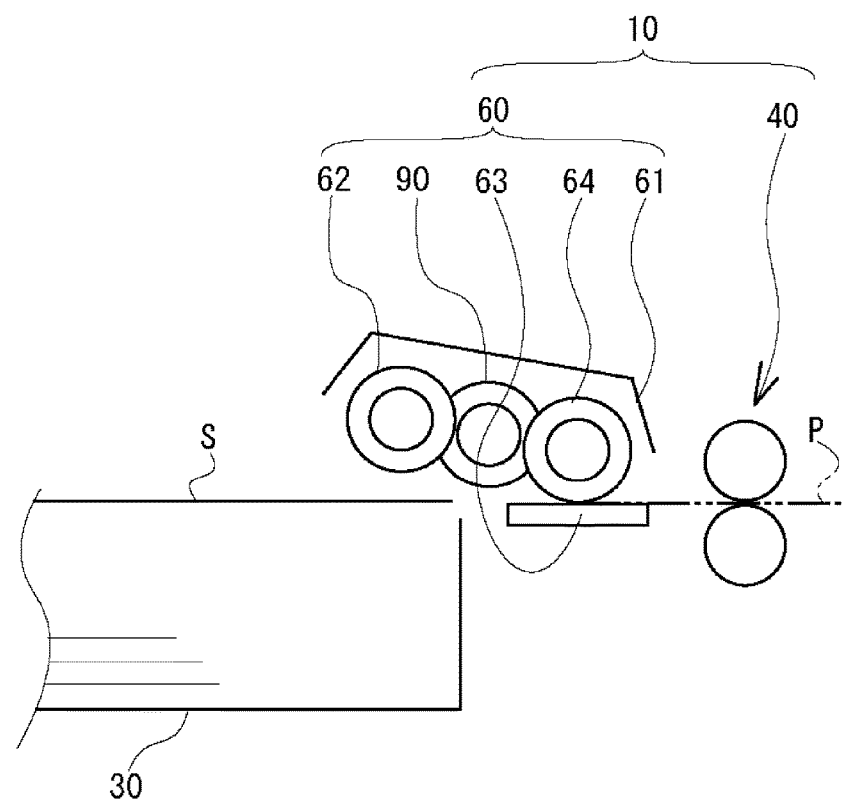
Figure 4:
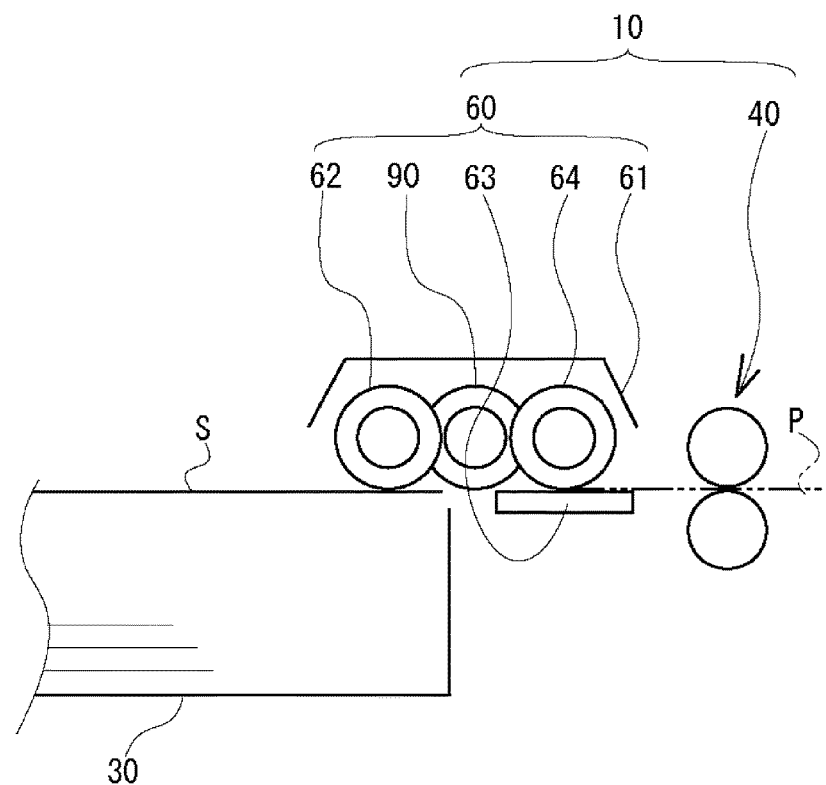
FIG. 4 is a diagram viewing the sheet feeder according to the embodiment from the front side, and illustrates a schematic diagram illustrating a state (an operation state) during the supplying operation of the sheet feeder.

As illustrated in FIGS. 2 to 4, the separation pad 63 is arranged at a conveyance guide (on the right side of the PR 62 viewing the image forming apparatus 10 from the front side) on an upstream side of the conveying path P. Then, the separation pad 63 is attached on a top surface of a lower-side conveyance guide.

SR

The SR 64 has a function to supply the sheet S handed over by the PR 62 to the downstream side of the conveying path P (the image forming unit 50 as one example). As illustrated in FIGS. 2 to 4, the SR 64 is arranged on an opposite side of the separation pad 63 across the conveying path P. As illustrated in FIGS. 3 to 6, the SR 64 includes a cylindrically-shaped roller-holding body 64A, onto the outer peripheral surface of which a rubber-made roller body is fitted, and a shaft 64B that passes through the roller-holding body 64A. The shaft 64B protrudes from both ends of the roller-holding body 64A and is rotatably supported by the housing 61 in a state where its axial direction is aligned with the apparatus-depth-direction that is orthogonal to the conveyance direction.

Then, the SR 64 rotates in a predetermined direction (an arrow direction attached to the SR 64 in FIG. 6, namely, a direction identical to the PR 62) around the shaft while sandwiching the sheet S handed over by the PR 62 with the separation pad 63 to supply the sheet S to the downstream side of the conveying path P with respect to the separation pad 63.

Rotating Unit

Figure 5:
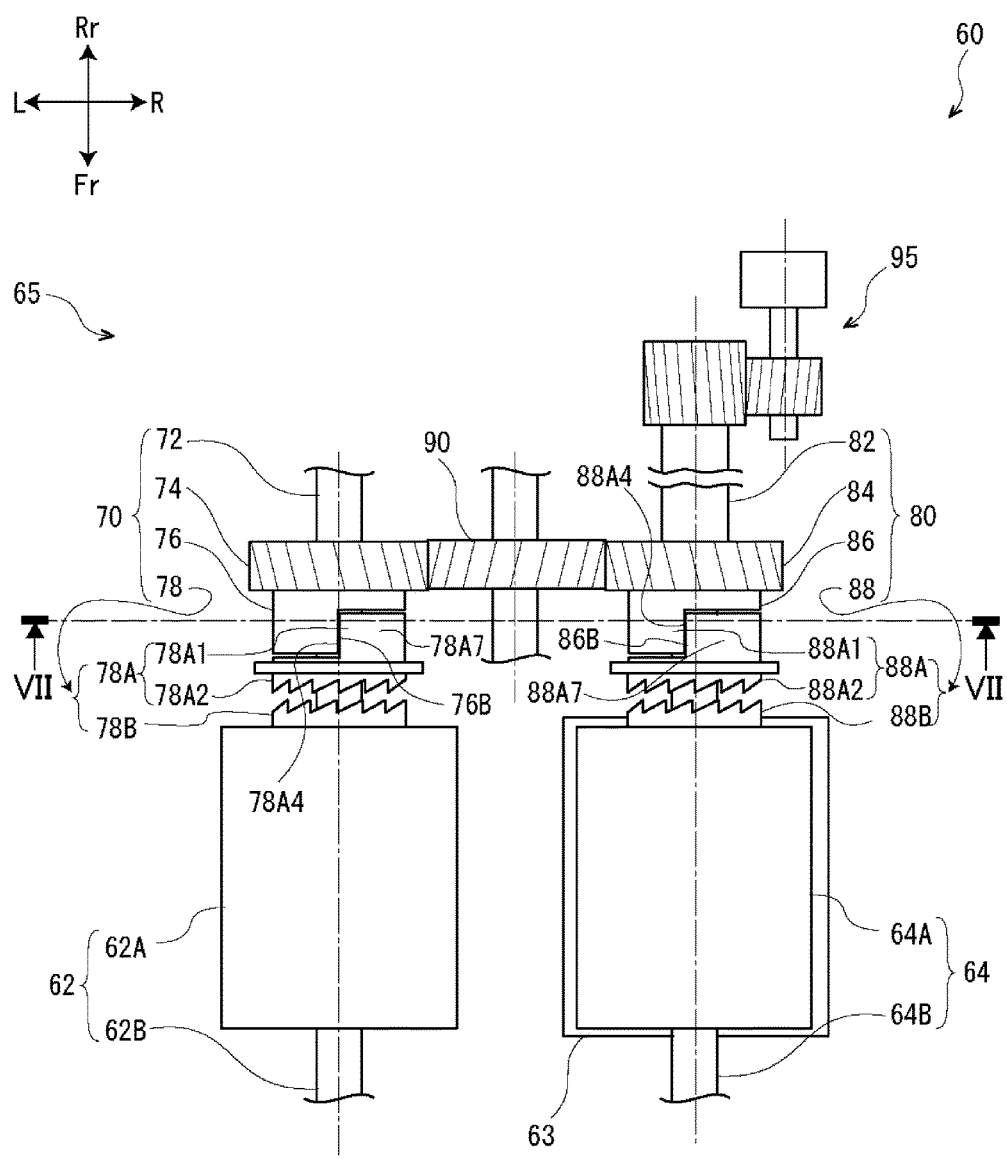
FIG. 5 is a diagram viewing the sheet feeder according to the embodiment from a top surface side, and illustrates a schematic diagram illustrating a state where the sheet feeder does not send out a sheet during the supplying operation.
Figure 6:
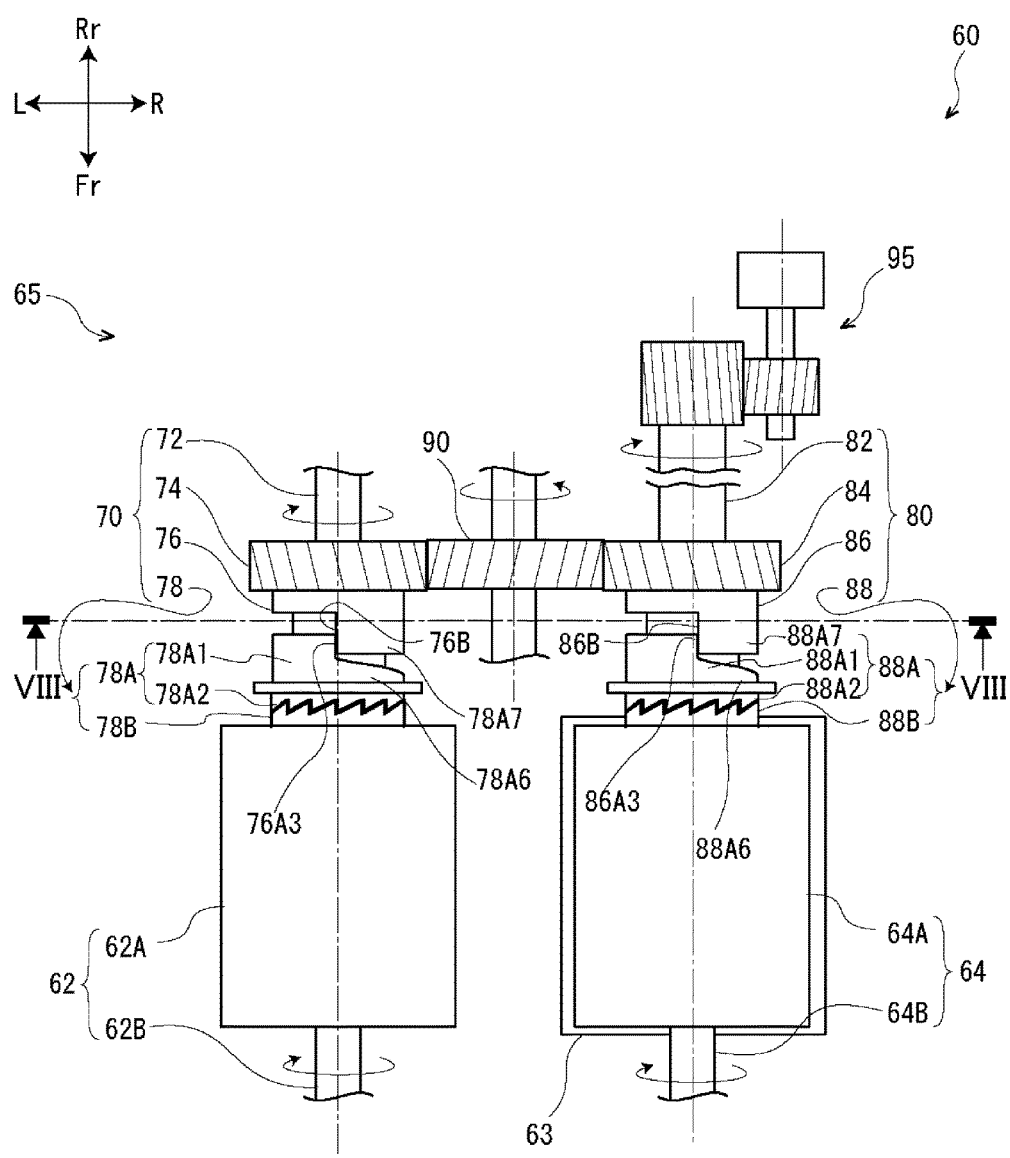
FIG. 6 is a diagram viewing the sheet feeder according to the embodiment from a top surface side, and illustrates a schematic diagram illustrating a state where the sheet feeder sends out the sheet during the supplying operation.

The rotating unit 65 has a function to normally rotate each of the PR 62 and the SR 64 around the shaft. In this case, the rotating unit 65 has a function to normally rotate the SR 64 (causes the SR 64 to start the normal rotation) after a start of the normal rotation of the PR 62 (see FIG. 9). As illustrated in FIGS. 5 and 6, the rotating unit 65 is configured including the first one-way clutch 70 (an exemplary first drive transmission mechanism), the second one-way clutch 80 (an exemplary second drive transmission mechanism), the transmission gear 90 (an exemplary rotator), and a motor 95 (an exemplary driving source). In the following, the first one-way clutch 70 is denoted as the OC 70, and the second one-way clutch 80 is denoted as the OC 80.

First One-Way Clutch

The OC 70 has a function to normally rotate around the shaft to transmit torque for normally rotating the PR 62 to the PR 62. The OC 70 includes a first shaft 72 (an exemplary first shaft), a first gear 74 (an exemplary first input gear), a first engaging portion 76 (an exemplary first connecting claw), and a first connecting portion 78. The first gear 74 and the first engaging portion 76 are integrally formed.

First Engaging Portion, First Shaft, and First Gear

The first shaft 72 passes through the PR 62 to rotatably support the PR 62. The first shaft 72 is rotatable around the shaft with end portions of both sides supported by the housing 61. The first gear 74 is secured to one end portion (an outer periphery of the one end portion) of the first shaft 72. Then, the first gear 74 is normally rotated around the shaft by the normal rotation of a second gear 84 (also referred to as a second input gear), which will be described later, via the transmission gear 90.

First Engaging Portion

The first engaging portion 76 is located upright toward the PR 62 from a side surface of the first gear 74 and has a function to normally rotate around the shaft to normally rotate a first transmitting portion 78A, which configures the first connecting portion 78 and will be described later, around a shaft. As illustrated in FIGS. 5 and 6, the first engaging portion 76 is arranged between the PR 62 and the first gear 74 in an axial direction (apparatus depth direction) of the first shaft 72. A part of the first engaging portion 76 is protruded. That is, a step is formed in the first engaging portion 76. Here, the first engaging portion 76 according to the embodiment is, as one example, protruded in an arc shape in a range of 120° over a circumferential direction of a whole circumference (see FIGS. 7 and 8). In the following description, in end faces in the circumferential direction of the protrusion of the first engaging portion 76, a face facing to a normal-rotation direction is defined as a face 76A, and a face facing to a reverse-rotation direction is defined as a face 76B (see FIGS. 7 and 8).

First Connecting Portion

As illustrated in FIGS. 5 and 6, the first connecting portion 78 includes the first transmitting portion 78A (an exemplary first moving body) and a first transmitted portion 78B (an exemplary first saw-teeth). As illustrated in FIGS. 5 and 6, the first transmitting portion 78A and the first transmitted portion 78B are arranged between the first engaging portion 76 and the PR 62 in the axial direction (apparatus depth direction) of the first shaft 72, and aligned from the apparatus-depth-direction far-side to the apparatus-depth-direction front side in order of these descriptions.

First Transmitting Portion

The first transmitting portion 78A, in association with the normal rotation of the first engaging portion 76, has a function to move from a first engaging portion 76 side to a first transmitted portion 78B side in the axial direction while normally rotating to transmit the torque for normally rotating the PR 62 to the first transmitted portion 78B. As illustrated in FIGS. 5 and 6, the first transmitting portion 78A includes a first engaged portion 78A1 (also referred to as a first connected claw) and a saw-teeth portion 78A2 (an exemplary second saw-teeth). The first transmitting portion 78A is a pipe-shaped member and fitted onto an outer periphery of the first shaft 72 in a movable state in the axial direction of the first shaft 72.

The first engaged portion 78A1 is a portion that engages with the first engaging portion 76. As illustrated in FIGS. 5 to 8, the first engaged portion 78A1 has a first wall 78A7 (first claw portion) and a second wall 78A6.

Figure 7:
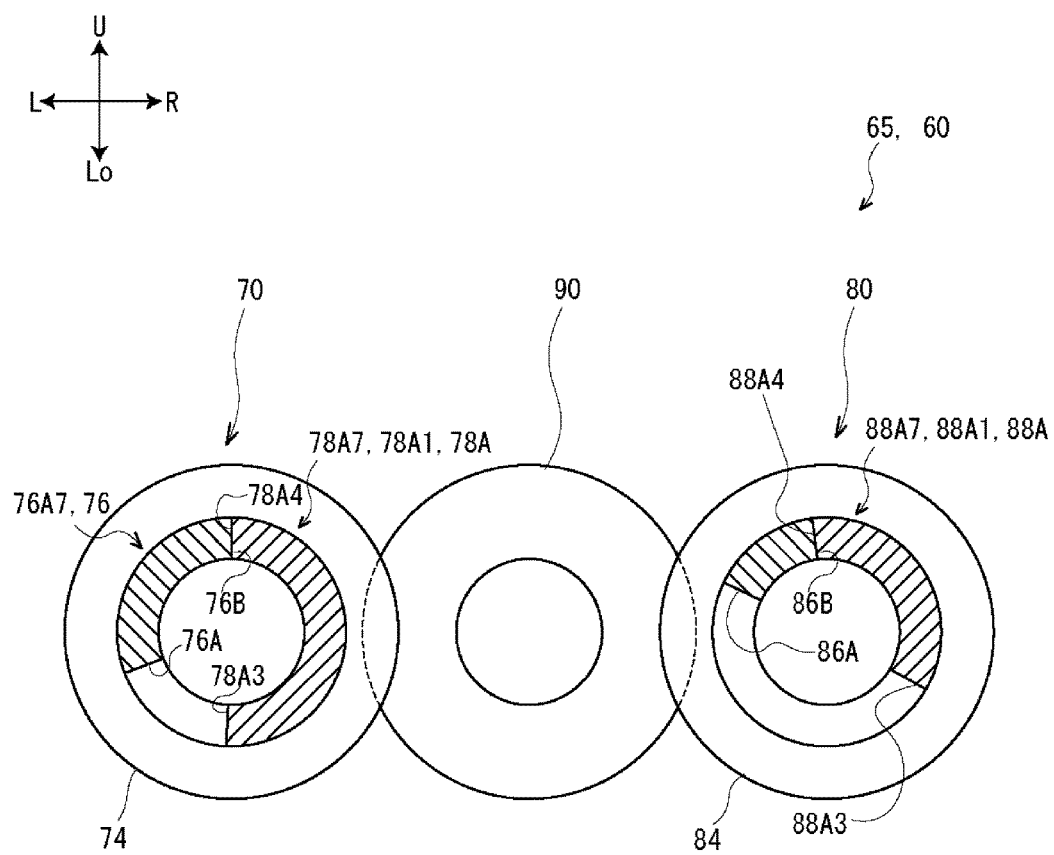
FIG. 7 illustrates a partial cross-sectional view taken along the VII-VII section line of the sheet feeder in FIG. 5.
Figure 8:
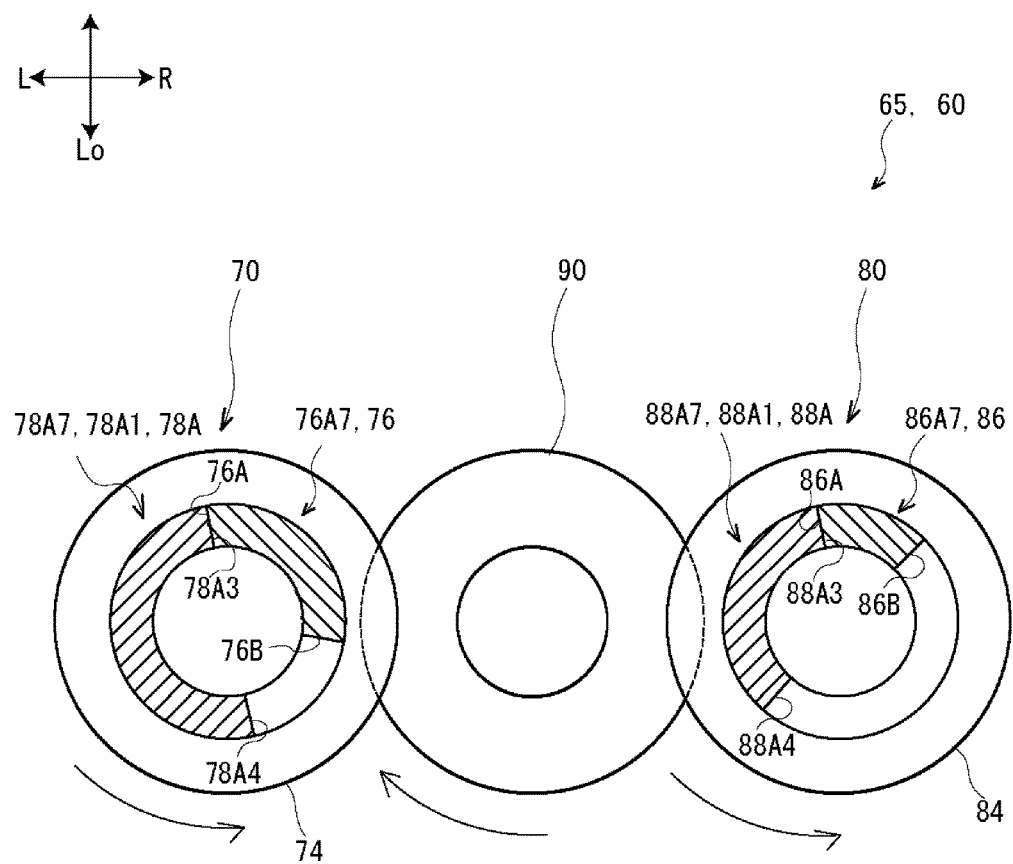
FIG. 8 illustrates a partial cross-sectional view taken along the VIII-VIII section line of the sheet feeder in FIG. 6.

As illustrated in FIGS. 5, 7 and 8, the first wall 78A7 of the first engaged portion 78A1 is a wall that protrudes to the first engaging portion 76 side with an identical height and in an arc shape, in a range of, as one example, 180° over a circumferential direction, of a whole circumference of the first engaged portion 78A1. In the following description, in the first wall 78A7, a face facing to the reverse-rotation direction (namely, a face opposed to the face 76A) of the first engaged portion 78A1 is defined as a face 78A3, and a face facing to the normal-rotation direction (namely, a face opposed to the face 76B) of the first engaged portion 78A1 is defined as a face 78A4.

As illustrated in FIGS. 6 to 8, the second wall 78A6 is a wall that protrudes to the first engaging portion 76 side with an arc-shaped inclination in a range of, as one example, 60° over the circumferential direction, of the whole circumference of the first engaged portion 78A1. The second wall 78A6 has a height (a protrusion amount) that becomes gradually higher over a downstream side from an upstream side in the normal-rotation direction of the first engaged portion 78A1. As illustrated in FIG. 6, a maximum height (a maximum protrusion amount) of the second wall 78A6 is smaller than the height (the protrusion amount) of the first wall 78A7 of the first engaged portion 78A1.

As illustrated in FIGS. 5 and 6, the saw-teeth portion 78A2 is arranged on the opposite side to the first engaged portion 78A1, in the axial direction. The saw-teeth portion 78A2 has triangular teeth configured by an orthogonal surface orthogonal to the normal-rotation direction of the first shaft 72 and an inclined surface that forms an acute angle relative to the reverse-rotation direction of the first shaft 72.

First Transmitted Portion

The first transmitted portion 78B is ring-shaped saw-teeth formed on a side surface of the PR 62, and has a function to engage with the saw-teeth portion 78A2 of the first transmitting portion 78A, during the normal rotation.

With the configuration described above, the normal rotation around the shaft of the first engaging portion 76 causes the face 76A of the first engaging portion 76 to contact with the face 78A3 of the first wall 78A7 and causes the first transmitting portion 78A to engage with the first engaging portion 76 to normally rotate around the shaft (see FIGS. 6 and 8). Until the normal rotation around the shaft of the first engaging portion 76 causes the face 76A of the first engaging portion 76 to contact with the face 78A3 of the first wall 78A7, moving a corner of the face 76A side of the first engaging portion 76 on the inclined surface of the second wall 78A6 causes the first transmitting portion 78A to move to the first transmitted portion 78B side in the axial direction. As a result, the first transmitting portion 78A (the saw-teeth portion 78A2 of the first transmitting portion 78A) engages with the first transmitted portion 78B (the saw-teeth of the first transmitted portion 78B) and the first transmitted portion 78B normally rotates around the shaft. In association with this, the PR 62 also normally rotates around the shaft.

FIGS. 5 and 7 illustrate the positional relationship of the first engaging portion 76 and the first transmitting portion 78A in a state where the sheet S is not sent out during the supplying operation, and FIGS. 6 and 8 illustrates the positional relationship of the first engaging portion 76 and the first transmitting portion 78A in a state where the sheet S is sent out during the supplying operation. A detail description will be given in the description of the supplying operation.

Second One-Way Clutch

Next, a description will be given of the OC 80 by referring to FIGS. 5 to 8.

The OC 80 has a function to normally rotate around the shaft to transmit the torque for normally rotating the SR 64 to the SR 64. The OC 80 includes a second shaft 82 (an exemplary second shaft), the second gear 84, a second engaging portion 86 (an exemplary second connecting claw), and a second connecting portion 88. The second gear 84 and the second engaging portion 86 are integrally formed.

Second Engaging Portion, Second Shaft and Second Gear

The second shaft 82 passes through the SR 64 to rotatably support the SR 64. The second shaft 82 is supported on end portions of both sides by the housing 61 to be rotatable around the shaft. The second gear 84 is secured to one end portion (an outer periphery of the one end portion) of the second shaft 82. Then, the second shaft 82 is normally rotated around the shaft by the motor 95.

Second Engaging Portion

The second engaging portion 86 is located upright toward the SR 64 from a side surface of the second gear 84 and has a function to normally rotate around the shaft to normally rotate a second transmitting portion 88A (an exemplary second moving body), which configures the second connecting portion 88 and will be described later. As illustrated in FIGS. 5 and 6, the second engaging portion 86 is arranged between the SR 64 and the second gear 84 in an axial direction (apparatus depth direction) of the second shaft 82. A part of the second engaging portion 86 is protruded. That is, a step is formed in the second engaging portion 86. Here, the second engaging portion 86 according to the embodiment is protruded in an arc shape in a range of, as one example, 60° over a circumferential direction of a whole circumference (see FIGS. 7 and 8). In the following description, in end faces in the circumferential direction of the protrusion of the second engaging portion 86, a face facing to the normal-rotation direction is defined as a face 86A, and a face facing to the reverse-rotation direction is defined as a face 86B (see FIGS. 7 and 8).

Second Connecting Portion

As illustrated in FIGS. 5 and 6, the second connecting portion 88 includes the second transmitting portion 88A and a second transmitted portion 88B (an exemplary third saw-teeth). As illustrated in FIGS. 5 and 6, the second transmitting portion 88A and the second transmitted portion 88B are arranged between the second engaging portion 86 and the SR 64 in the axial direction (apparatus depth direction) of the second shaft 82, and aligned from the apparatus-depth-direction far-side to the apparatus-depth-direction front side in order of these descriptions.

Second Transmitting Portion

The second transmitting portion 88A, in association with the normal rotation of the second engaging portion 86, has a function to move from a second engaging portion 86 side to a second transmitted portion 88B side in an axial direction while normally rotating to transmit the torque for normally rotating the SR 64 to the second transmitted portion 88B. As illustrated in FIGS. 5 and 6, the second transmitting portion 88A includes a second engaged portion 88A1 (also referred to as a second connected claw) and a saw-teeth portion 88A2 (an exemplary fourth saw-teeth). The second transmitting portion 88A is a pipe-shaped member and is fitted into an outer periphery of the second shaft 82 in a movable state in the axial direction of the second shaft 82.

The second engaged portion 88A1 is a portion that engages with the second engaging portion 86. As illustrated in FIGS. 5 to 8, the second engaged portion 88A1 has a first wall 88A7 (second claw portion) and a second wall 88A6.

As illustrated in FIGS. 5, 7, and 8, the first wall 88A7 of the second engaged portion 88A1 is a wall that protrudes on the second engaging portion 86 side with an identical height in an arc shape in a range of, as one example, 120° over an circumferential direction of a whole circumference of the second engaged portion 88A1. In the following description, in the first wall 88A7, a face facing the reverse-rotation direction of the second engaged portion 88A1 (namely, a face opposed to the face 86A) is defined as a face 88A3, and a face facing the normal-rotation direction of the second engaged portion 88A1 (namely, a face opposed to the face 86B) is defined as a face 88A4. As described above, in this embodiment, the first wall 78A7 (the first claw portion) has a width (180° in this example) in the circumferential direction larger than a width (120° in this example) in the circumferential direction of the first wall 88A7 (the second claw portion), thus ensuring the drive transmission period of the second drive transmission mechanism longer than the drive transmission period of the first drive transmission mechanism.

As illustrated in FIGS. 6 to 8, the second wall 88A6 is a wall that protrudes to the second engaging portion 86 side with an arc-shaped inclination in a range of, as one example, 60° over a circumferential direction of a whole circumference of the second engaged portion 88A1. The second wall 88A6 has a height (a protrusion amount) that becomes gradually higher over a downstream side from an upstream side in the normal-rotation direction of the second engaged portion 88A1. As illustrated in FIG. 6, a maximum height (a maximum protrusion amount) of the second wall 88A6 is smaller than the height (the protrusion amount) of the first wall 88A7 of the second engaged portion 88A1.

As illustrated in FIGS. 5 and 6, the saw-teeth portion 88A2 is arranged on the opposite side to the second engaged portion 88A1, in the axial direction. The saw-teeth portion 88A2 has triangular teeth configured by an orthogonal surface orthogonal to the normal-rotation direction of the second shaft 82 and an inclined surface that forms an acute angle relative to the reverse-rotation direction of the second shaft 82.

Second Transmitted Portion

The second transmitted portion 88B is ring-shaped saw-teeth formed on a side surface of the SR 64, and has a function to engage with the saw-teeth portion 88A2 of the second transmitting portion 88A, during the normal rotation.

With the configuration described above, the normal rotation around the shaft of the second engaging portion 86 causes the face 86A of the second engaging portion 86 to contact with the face 88A3 of the first wall 88A7 and causes the second transmitting portion 88A to engage with the second engaging portion 86 to normally rotate around the shaft (see FIGS. 6 and 8). Until the normal rotation around the shaft of the second engaging portion 86 causes the face 86A of the second engaging portion 86 to contact with the face 88A3 of the first wall 88A7, moving a corner of the face 86A side of the second engaging portion 86 on the inclined surface of the second wall 88A6 causes the second transmitting portion 88A to move to the second transmitted portion 88B side in the axial direction. As a result, the second transmitting portion 88A (the saw-teeth portion 88A2 of the second transmitting portion 88A) engages with the second transmitted portion 88B (the saw-teeth of the second transmitted portion 88B) and the second transmitted portion 88B normally rotates around the shaft. In association with this, the SR 64 also normally rotates around the shaft.

Transmission Gear

The transmission gear 90 has a function to rotate in association with the normal rotation of one of the OC 70 and the OC 80 (in the embodiment, the OC 80) to normally rotate the other (in the embodiment, the OC 70). As illustrated in FIGS. 5 to 8, the transmission gear 90 is arranged between the first gear 74 and the second gear 84 in an engaged state with the first gear 74 and the second gear 84.

Motor

The motor 95 has a function to drive one of the OC 70 and the OC 80 (in the embodiment, the OC 80) to normally rotate the one (the OC 80) around the shaft. As illustrated in FIGS. 5 and 6, the motor 95 is mounted to, as one example, a one end side of the second shaft 82 via a plurality of gears.

Supplying Operation

Next, a description will be given of the supplying operation using the sheet feeder 60 according to the embodiment by referring to FIGS. 5 to 9. The following describes a case, for example, when an image is formed on a plurality of (as one example, two sheets) of the sheet S.

The control unit CU that has received image data from an external device (not illustrated) sends a remote signal to respective components that configure the image forming unit 50 and the motor 95 of the sheet feeder 60. The control unit CU operates a driving source (not illustrated) to swing the housing 61 and changes a posture of the sheet feeder 60 from a posture of a standby state (see FIG. 3) to a posture of an operation state (see FIG. 4).

Figure 9:
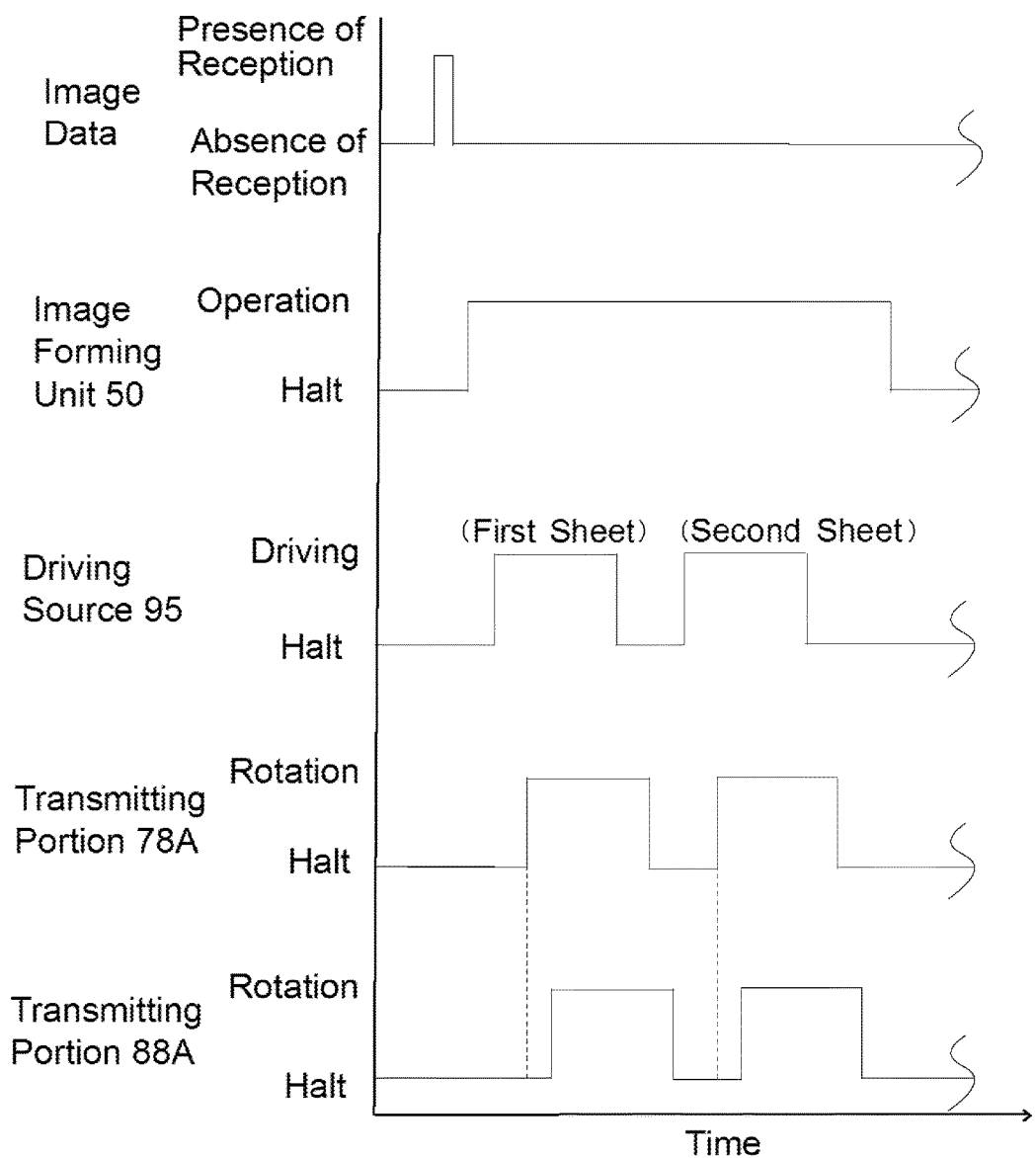
FIG. 9 illustrates a timing chart for describing an operation timing and an operation time period of respective components that configure the sheet feeder according to the embodiment.

Next, as illustrated in FIG. 9, in a period during forming a toner image onto the photoreceptor 51 in the image forming unit 50, the control unit CU drives the motor 95 for a predetermined period. In association with this, the first engaging portion 76 of the OC 70 and the second engaging portion 86 of the OC 80, which are arranged at an initial position (see FIG. 5), each start rotation around the shaft. Then, after the first engaging portion 76 of the OC 70 has moved the first transmitting portion 78A to the first transmitted portion 78B side (see FIG. 6), the first transmitting portion 78A and the first transmitted portion 78B are engaged with one another, and the face 76A of the first engaging portion 76 contacts with the face 78A3 of the first engaged portion 78A1 (see FIG. 8). Further, the normal rotation of the first transmitting portion 78A, which is connected to the first transmitted portion 78B, around the shaft (see FIGS. 8 and 9) while being pushed by the first engaging portion 76 normally rotates the PR 62 around the shaft. As a result, the normal rotation of the PR 62 around the shaft sends out the sheet S on the separation pad 63 from the sheet feed cassette 30.

In the OC 80, after the second engaging portion 86 has moved the second transmitting portion 88A to the second transmitted portion 88B side (see FIG. 6), the second transmitting portion 88A and the second transmitted portion 88B are engaged with one another, and the face 86A of the second engaging portion 86 contacts with the face 88A3 of the second engaged portion 88A1 (see FIG. 8). Further, the normal rotation of the second transmitting portion 88A, which is connected to the second transmitted portion 88B, around the shaft (see FIGS. 8 and 9) while being pushed by the second engaging portion 86 normally rotates the SR 64 around the shaft. As a result, the normal rotation of the SR 64 around the shaft sandwiches the sheet S, which has been sent out by the PR 62, with the separation pad 63 to supply the sheet S to the downstream side of the conveying path P with respect to the separation pad 63.

Here, since a time period until the second engaging portion 86 of the OC 80 contacts with the second transmitting portion 88A is longer than the time period until the first engaging portion 76 of the OC 70 contacts with the first transmitting portion 78A (see FIG. 9), the time period (a second drive transmission time) until the second connecting portion 88 of the OC 80 (the exemplary second drive transmission mechanism) is connected from after a start of driving by the motor 95 is longer than the time period (a first drive transmission time) until the first connecting portion 78 of the OC 70 (the exemplary first drive transmission mechanism) is connected from after the start of driving by the motor 95. That is, in the embodiment, the time period until the OC 80 is connected from the driving of the motor 95 is set to be longer than the time period until the OC 70 is connected from the driving of the motor 95. In the embodiment, timing when the SR 64 starts the normal rotation around the shaft is set to be on a conveyance-direction upstream side of the sheet S on the separation pad 63 with respect to a nip (a contact portion of the SR 64 and the separation pad 63) that is formed by SR 64 and a retard roller after the sheet S is sent into the separation pad 63 by the PR 62.

Next, the control unit CU halts the driving of the motor 95 in accordance with the timing when the sheet S is supplied to the conveyance apparatus 40 (the drive rollers of the conveyance apparatus 40). As a result, the first engaging portion 76 and the second engaging portion 86 each halt the rotation around the shaft, and the PR 62 and the SR 64 each are pulled by the sheet S, which is conveyed by conveyance rollers arranged on the downstream side of the conveyance apparatus 40, to normally rotate around the shaft. In association with this, the state where the first transmitted portion 78B and the second transmitted portion 88B are connected to the first transmitting portion 78A and the second transmitting portion 88A, respectively, is released (see FIG. 5). By reversely rotating relative to the first transmitting portion 78A and the second transmitting portion 88A, the first transmitted portion 78B and the second transmitted portion 88B each idle by an action of the one-way clutch.

Next, the control unit CU performs the supplying operation of a second sheet S similarly to the supplying operation of the first sheet S (see FIG. 9). Then, when the second sheet S is supplied to the conveyance apparatus 40, the supplying operation by the sheet feeder 60 terminates.

Effect

Next, a description will be given of effects of the embodiment by referring to the drawings.

Now, for example, in a configuration (referred to as a comparative configuration) where the SR 64, which contacts with the separation pad 63, starts the normal rotation around the shaft simultaneously with the start of the normal rotation of the PR 62 around the shaft, a vibration sound is generated in association with idling of the SR 64 for a time period until the sheet S is sent into the nip of the separation pad 63 and the SR 64 from the start of the normal rotation of the PR 62.

In contrast to this, in the embodiment, including the rotating unit 65 in the sheet feeder 60 causes the SR 64 to start the normal rotation around the shaft before a lead edge of the sheet S sent by the PR 62 arrives at the nip portion after the start of the normal rotation of the PR 62 around the shaft.

Consequently, the sheet feeder 60 according to the embodiment ensures shortening a duration of occurrence of the vibration sound in association with the idling, compared with a sheet feeder of the above-described comparative configuration. In association with this, the image forming apparatus 10 according to the embodiment ensures shortening the duration of occurrence of the vibration sound in association with the idling of the SR 64 during the image forming operation, compared with an image forming apparatus that includes the sheet feeder of the above-described comparative configuration.

Furthermore, because of including the rotating unit 65, the sheet feeder 60 according to the embodiment ensures shortening the duration of occurrence of the vibration sound in association with the idling of the SR 64 even when supplying the second and subsequent sheets S in supplying a plurality of sheets S.

As described above, while a description has been given of the disclosure with the embodiment as an example, the technical scope of the disclosure is not limited to the embodiment. For example, the following configurations are also included in the technical scope of the disclosure.

Figure 10:
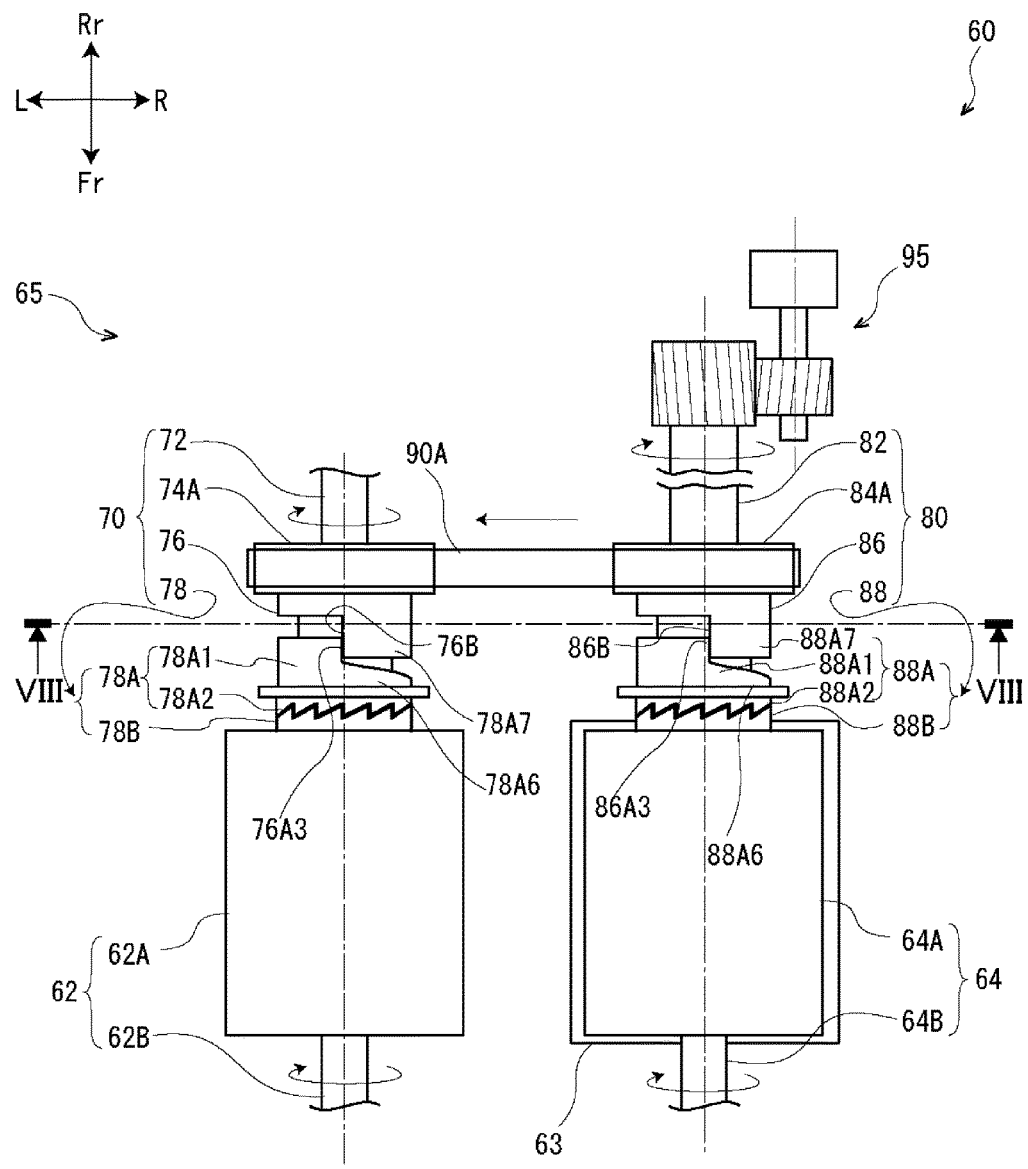
FIG. 10 illustrates a schematic diagram viewing a modification of the sheet feeder according to the embodiment from an upper side.

While it has been described in the embodiment that the transmission gear 90 is rotationally driven by the second gear 84 to normally rotate the first gear 74, as in a modification in FIG. 10, the first gear 74 and the second gear 84 each may be set to be pulleys 74A and 84A, and the transmission gear 90 may be set to be an endless belt 90A. In this case, the endless belt 90A is an exemplary rotator.

While it has been described in the embodiment that the motor 95 is mounted to the second shaft 82 of the OC 80, the motor 95 may be mounted to the first shaft 72 when one of the first shaft 72 and the second shaft 82 can be driven.

Figure 11:
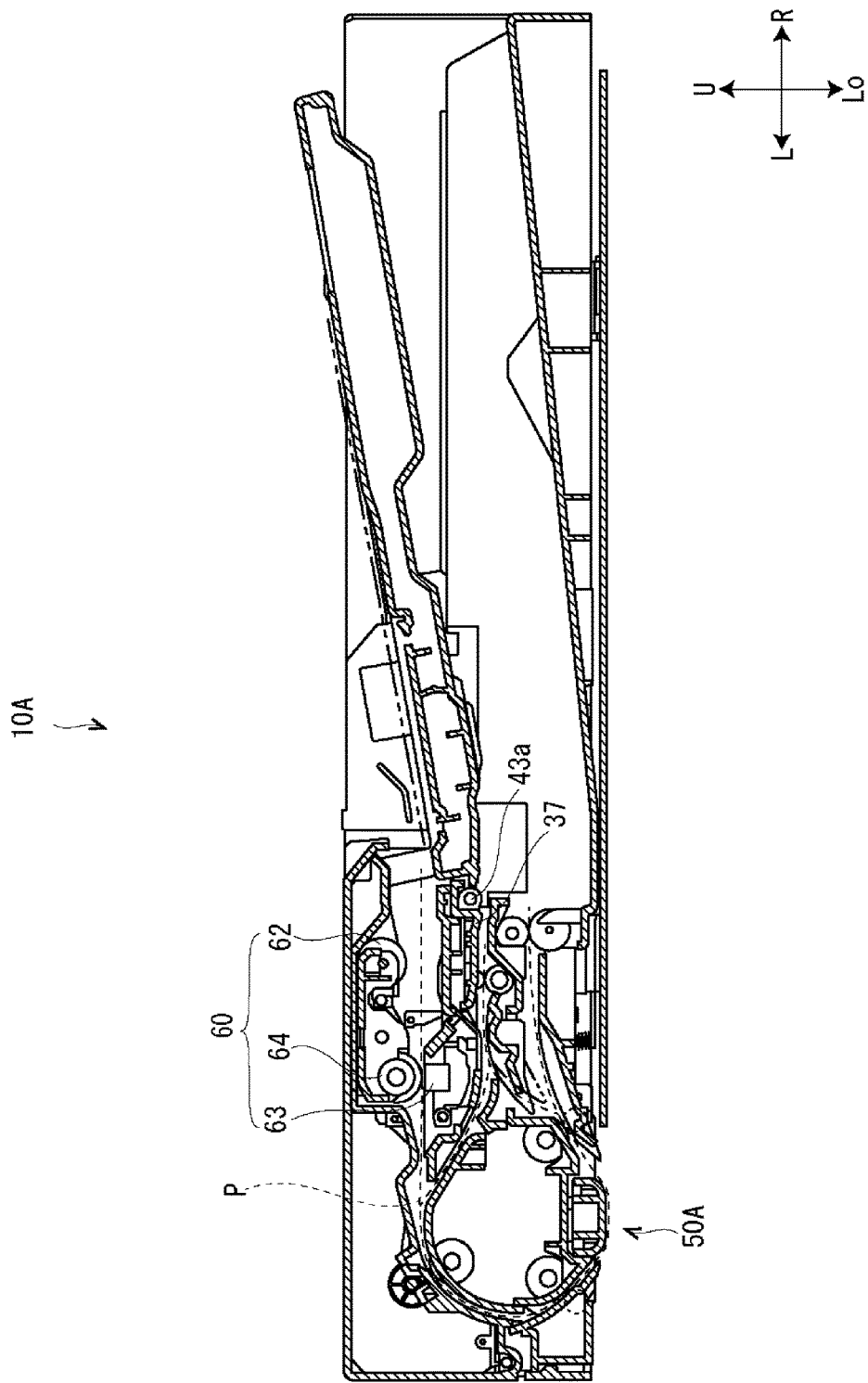
FIG. 11 illustrates a schematic diagram illustrating another application example (a first application example) of the sheet feeder according to the embodiment.

While it has been described in the embodiment that the sheet feeder 60 is a device to supply the sheet S housed in the sheet feed cassette 30 to the conveyance apparatus 40, the sheet feeder 60 may be also applied to other apparatuses other than the apparatus supplying the sheet S housed in the sheet feed cassette 30 as long as it ensures supplying (or moving) the sheet S one by one to a predetermined direction. For example, as an application example illustrated in FIG. 11, it may be applied to a reading apparatus 10A, what is called, such as a scanner and an ADF that include a reading unit 50A, which is arranged on the downstream side of the conveying path P with respect to the sheet feeder 60 and reads an image on the sheet S supplied by the sheet feeder 60. This ensures shortening the duration of occurrence of a sound noise in association with the idling of the SR 64 during scanning (reading image information of the sheet S) of the sheet S.

Figure 12:
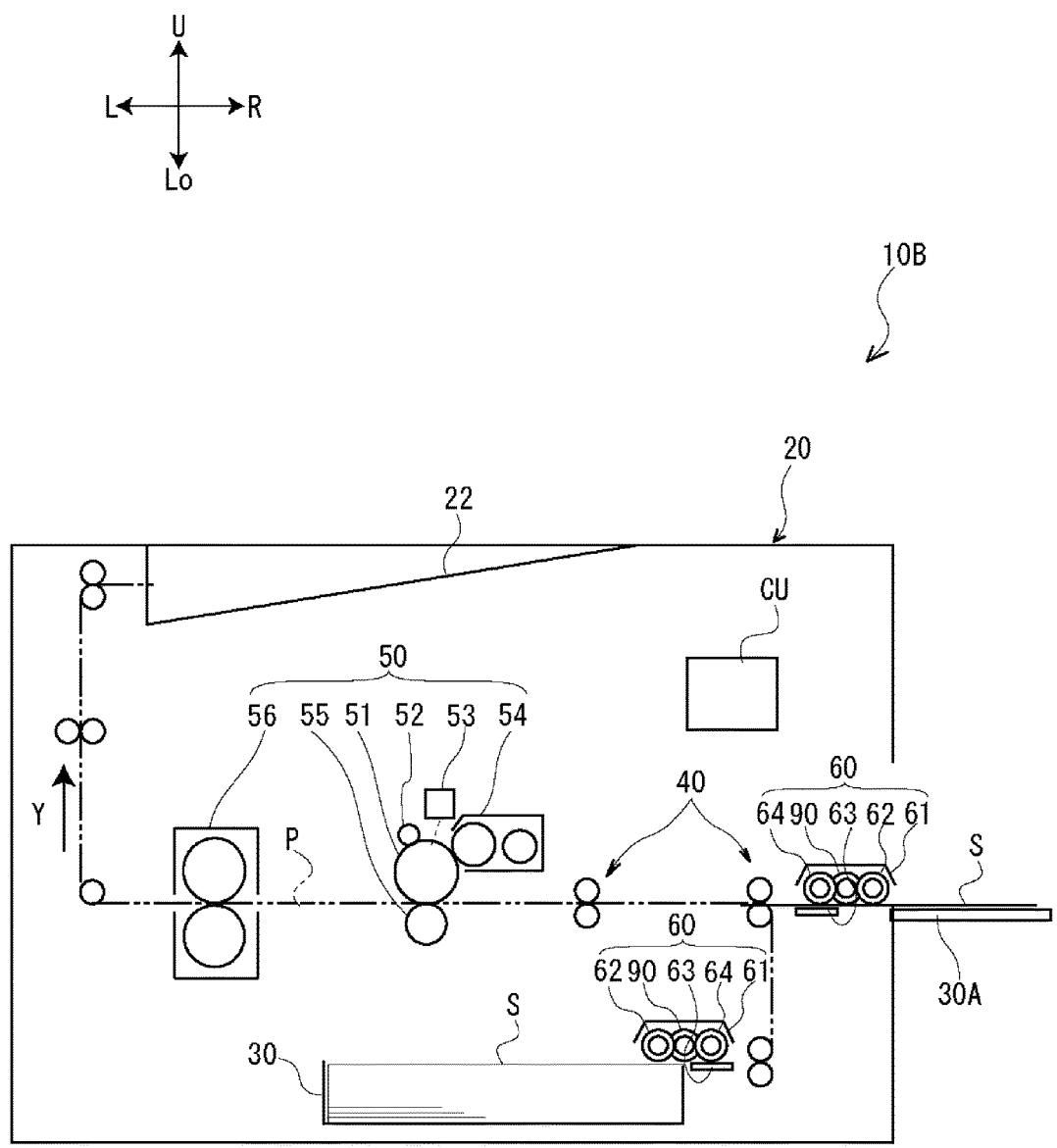
FIG. 12 illustrates a schematic diagram illustrating another application example (a second application example) of the sheet feeder according to the embodiment.

As another application example, like an image forming apparatus 10B illustrated in FIG. 12, the disclosure can be employed as the sheet feeder 60 for the sheet S arranged in, what is called, a manual bypass tray 30A.

While in the embodiment the separating member has been described as the separation pad 63, the separating member may be what is called a retard roller that forms a nip with the SR 64.

While the image forming apparatus 10 according to the embodiment has been described as an apparatus of the electrophotographic method, the image forming apparatus that belongs to the technical scope of the disclosure does not have to be an apparatus of the electrophotographic method as long as the apparatus forms an image on the sheet S supplied from the sheet feeder 60 or a sheet feeder that has a technical idea of the sheet feeder 60. For example, an Inkjet printing method and another method that form an image on the conveyed sheet S can be used.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A sheet feeder comprising:
a delivery roller that sends out a sheet to a conveying path by rotating in a first direction around a first shaft while contacting the sheet;
a supply roller that rotates in the first direction around a second shaft to supply the sheet to a downstream side of the conveying path;
a separating member arranged on an opposite side of the supply roller across the conveying path, the separating member forming a nip with the supply roller to separate a plurality of sheets;
a driving source that generates a rotary drive power to rotate the delivery roller and the supply roller in the first direction;
a first drive transmission mechanism transmitting the rotary drive power in the first direction to the delivery roller in a first drive transmission time from the start of driving of the driving source, the first drive transmission mechanism including
   a first input gear mounted to the first shaft, the first input gear receiving the driving power,
   annular first saw-teeth formed on a side surface of the delivery roller,
   a first connecting claw that protrudes from a side surface of the first input gear,
   a first moving body that is rotatable around the first shaft and is movable on the first shaft, between the first input gear and the delivery roller,
   a first connected claw that protrudes from one side surface of the first moving body to be connectable to the first connecting claw, and
   annular second saw-teeth formed on another side surface of the first moving body and engageable with the first saw-teeth, wherein
   when the first input gear rotates in the first direction, the first connecting claw rotates in the first direction, and the first connected claw connects to the first connecting claw while moving to the delivery roller side, and
   the first saw-teeth engage with the second saw-teeth to rotate the delivery roller in the first direction;
a second drive transmission mechanism transmitting the rotary drive power in the first direction to the supply roller in a second drive transmission time from the start of driving of the driving source, the second drive transmission mechanism including
   a second input gear mounted to the second shaft, the second input gear receiving the driving power,
   annular third saw-teeth formed on a side surface of the supply roller,
   a second connecting claw that protrudes from a side surface of the second input gear,
   a second moving body that is rotatable around the second shaft and is movable on the second shaft, between the second input gear and the supply roller,
   a second connected claw that protrudes from one side surface of the second moving body to be connectable to the second connecting claw, and
   annular fourth saw-teeth formed on another side surface of the second moving body and engageable with the third saw-teeth, wherein
   when the second input gear rotates in the first direction, the second connecting claw rotates in the first direction, and the second connected claw connects to the second connecting claw while moving to the supply roller side, and
   the third saw-teeth engage with the fourth saw-teeth to rotate the supply roller in the first direction; and
a controller that controls the driving source; wherein
a connecting period of the second connecting claw and the second connected claw is longer than a connecting period of the first connecting claw and the first connected claw, such that the second drive transmission mechanism is driven for a second drive-rotational period that is longer than a first drive-rotational period during which the first drive transmission mechanism is driven; and
when the control starts driving the driving source, the supply roller starts to rotate in the first direction after the delivery roller starts to rotate in the first direction.

2. The sheet feeder according to claim 1 wherein the supply roller starts rotating before a lead edge of the sheet sent by the delivery roller arrives at the nip portion after the delivery roller starts rotating.

3. The sheet feeder according to claim 1, wherein:
the first connected claw includes a first claw portion that protrudes in an arc shape in a circumferential direction to engage with the first connecting claw;
the second connected claw includes a second claw portion that protrudes in an arc shape in a circumferential direction to engage with the second connecting claw; and
a width of the first claw portion is wider than a width of the second claw portion in the circumferential direction.

4. A reading apparatus comprising:
the sheet feeder according to claim 1; and
a reading unit arranged on the downstream side of the conveying path with respect to the sheet feeder, the reading unit reading an image of the sheet supplied by the sheet feeder.

5. An image forming apparatus comprising:
the sheet feeder according to claim 1; and
an image forming unit arranged on the downstream side of the conveying path with respect to the sheet feeder, the image forming unit forming an image on the sheet supplied by the sheet.

* * * * *